United States Patent
Yamashiro et al.

(10) Patent No.: US 8,197,310 B2
(45) Date of Patent: *Jun. 12, 2012

(54) DUST BOX AND ELECTRIC TOOL WITH THE DUST BOX

(75) Inventors: Yukio Yamashiro, Anjo (JP); Hirokazu Hagiwara, Anjo (JP); Yoshifumi Morita, Anjo (JP); Takashi Kumagai, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,570

(22) Filed: Oct. 14, 2011

(65) Prior Publication Data

US 2012/0034856 A1 Feb. 9, 2012

Related U.S. Application Data

(63) Continuation of application No. 12/453,006, filed on Apr. 27, 2009, now Pat. No. 8,066,554.

(30) Foreign Application Priority Data

May 29, 2008 (JP) .................................. 2008-141290

(51) Int. Cl.
B24B 55/06 (2006.01)

(52) U.S. Cl. ........................................ 451/453; 451/357

(58) Field of Classification Search .................. 451/453, 451/454, 457, 356–358
See application file for complete search history.

(56) References Cited

U.S. PATENT DOCUMENTS

| | | | |
|---|---|---|---|
| 5,080,702 A | 1/1992 | Bosses | |
| 5,237,781 A | 8/1993 | Demetrius | |
| 6,514,131 B1* | 2/2003 | Reich et al. | 451/344 |
| 6,641,634 B2* | 11/2003 | Reich et al. | 55/385.1 |
| 6,746,321 B2 | 6/2004 | Link | |
| 6,830,507 B2* | 12/2004 | Reich et al. | 451/453 |
| 7,118,609 B2* | 10/2006 | Valentini | 55/385.1 |
| D546,156 S | 7/2007 | Aglassinger et al. | |
| 7,553,217 B2* | 6/2009 | Reich et al. | 451/344 |
| 7,799,104 B2 | 9/2010 | Valentini | |
| 8,070,845 B2* | 12/2011 | Roehm | 55/385.1 |
| 2005/0037699 A1 | 2/2005 | Park | |

FOREIGN PATENT DOCUMENTS

| | | |
|---|---|---|
| DE | 295 08 874 U1 | 10/1996 |
| DE | 298 25 228 U1 | 8/2006 |
| EP | 0 470 046 A1 | 2/1992 |
| EP | 0 558 253 A1 | 9/1993 |
| EP | 0 752 240 B1 | 1/1997 |
| JP | A-10-244467 | 9/1998 |
| RU | 2 223 025 C2 | 2/2004 |

OTHER PUBLICATIONS

European Search Report issued in Application No. EP 09 00 7091; mailed on Sep. 1, 2009. May 12, 2011 European Search Report in related Appln. No. 11159826.4.
Office Action issued in Russian Patent Application No. 2009-120367, on Feb. 8, 2010 (with translation).
Office Action-Decision issued in Russian Patent Application No. 2009-120367, on May 21, 2010 (with translation).

\* cited by examiner

*Primary Examiner* — Dung Van Nguyen
(74) *Attorney, Agent, or Firm* — Oliff & Berridge, PLC

(57) ABSTRACT

A dust box includes: an attachment portion configured to be attached to a dust-discharging nozzle extending from a housing of an electric tool; and a dust-collecting portion connected to the attachment portion and configured to store dust particles to be discharged from the nozzle. The dust-collecting portion mainly consists of a box which is made of synthetic resin and configured to be detachably connected to the attachment portion, and a paper bag received in the box and configured to store the dust particles to be discharged from the nozzle.

13 Claims, 4 Drawing Sheets

DUST BOX AND ELECTRIC TOOL WITH THE DUST BOX

This is a Continuation of application Ser. No. 12/453,006 filed Apr. 27, 2009, which claims the entire benefit of Japanese Patent Application Number 2008-141290 filed on May 29, 2008. The disclosures of the prior applications are hereby incorporated by reference herein in their entirety.

BACKGROUND

1. Field of the Invention

The present invention relates to a dust box which is attached to an electric tool such as a sander for the purpose of collecting dust particles, and also to an electric tool with the dust box.

2. Description of Related Art

A dust box is attached to a nozzle extending from a housing of an electric tool such as a sander, and utilized to collect dust particles, etc. to be discharged from the electric tool. For example, Japanese Laid-open Patent Publication No. 10-244467 discloses a dust-collecting container (dust box) made of paper.

However, according to the dust box disclosed in JP 10-244467 A, a fragile paper bag is exposed without protection, so that the paper bag is likely to deform or break during its use. The dust box is repeatedly used by emptying dust particles collected in the dust box. However, the paper bag deforms easily during disposal of the dust particles, which causes inconvenience for its usage.

In view of the above drawbacks of the conventional dust box, the present invention seeks to provide a dust box which is less likely to deform or break even if a paper bag is used and is convenient for its usage.

The present invention has been made in an attempt to eliminate the above disadvantages, and illustrative, non-limiting embodiments of the present invention overcome the above disadvantages and other disadvantages not described above.

SUMMARY

In order to achieve the above object, according to a first aspect of the present invention, a dust box comprises: an attachment portion configured to be attached to a dust-discharging nozzle extending from a housing of an electric tool; and a dust-collecting portion connected to the attachment portion and configured to store dust particles to be discharged from the nozzle, wherein the dust-collecting portion comprises a box which is made of synthetic resin and configured to be detachably connected to the attachment portion, and a paper bag received in the box and configured to store the dust particles to be discharged from the nozzle.

To further improve usability of the dust box, in a first specific embodiment of the present invention, the attachment portion and the dust-collecting portion may be connected by means of at least one hook and corresponding engagement portion. Further, the hook is formed on the attachment portion when the engagement portion is formed on the box, and is formed on the box when the engagement portion is formed on the attachment portion. Further, the hook is elastically coupled to the engagement portion when the attachment portion and the dust-collecting portion are assembled together.

To secure engagement and disengagement operations between the attachment portion and the dust-collecting portion by means of the hook, in a second specific embodiment of the present invention, the hook may protrude backward from the attachment portion, and the engagement portion may extend from an opening of the box and be folded back outward so as to extend backward along a side surface of the box without contacting thereto. Further, the engagement portion may provide an elastic strip onto which the hook is elastically hooked at a front-side portion of the elastic strip while a rear-side portion thereof is exposed when the attachment portion and the dust-collecting portion are assembled together, and an elastic engagement between the hook and the engagement portion is disengaged by depressing the rear-side portion of the elastic strip toward the side surface of the box.

To further improve reliability of elastic engagement and disengagement of the engagement portion relative to the hook, in a third specific embodiment of the present invention, a spring member may be attached to the box to ensure that the elastic strip is elastically supported by the spring member without contacting to the side surface of the box.

To improve handling ability of the box, in a fourth specific embodiment of the present invention, the box may be formed as a hollow rectangular box, and four longitudinal edges thereof may be chamfered.

In order to achieve the above object, according to a second aspect of the present invention, an electric tool comprises: a housing; a nozzle extending from the housing and configured to discharge dust particles from the housing; and the aforementioned dust box according to the first aspect of the present invention which is attached to the nozzle.

With the above configurations of the dust box and the electric tool according to the first and second aspects of the present invention, the paper bag of the dust box is always protected by the box. Therefore, the paper bag will not deform or break even if it is made of a fragile material, which is convenient for its usage.

In addition to the above advantageous effect of the present invention, the following effects can also be obtained by the specific embodiments as described above.

According to the first specific embodiment, use of the hook and the engagement portion enables the engagement and disengagement between the attachment portion and the dust-collecting portion to be readily performed, which can improve usability of the dust box.

According to the second specific embodiment, an elastic engagement between the hook and the engagement portion is disengaged by depressing the rear-side portion of the elastic strip toward the side surface of the box to cause the front-side portion of the elastic strip to deform inward. This can secure engagement and disengagement operations of the dust-collecting portion relative to the attachment portion.

According to the third specific embodiment, use of the spring member ensures that the elastic strip is elastically supported without contacting to the side surface of the box. This can further improve reliability of elastic engagement and disengagement of the engagement portion relative to the hook.

According to the fourth specific embodiment, four longitudinal edges of the box are chamfered. This can reduce the size of the box, which improves handling ability of the box.

BRIEF DESCRIPTION OF THE DRAWINGS

The above aspect, other advantages and further features of the present invention will become more apparent by describing in detail illustrative, non-limiting embodiments thereof with reference to the accompanying drawings, in which:

FIGS. 4A to 4C are explanatory views of the dust box, in which FIG. 4A is a front view, FIG. 4B is a side view, and FIG. 4C is a top view of the dust box.

DETAILED DESCRIPTION OF EMBODIMENTS

With reference to the accompanying drawings, one exemplary embodiment of the present invention will be described below.

Figure 1:
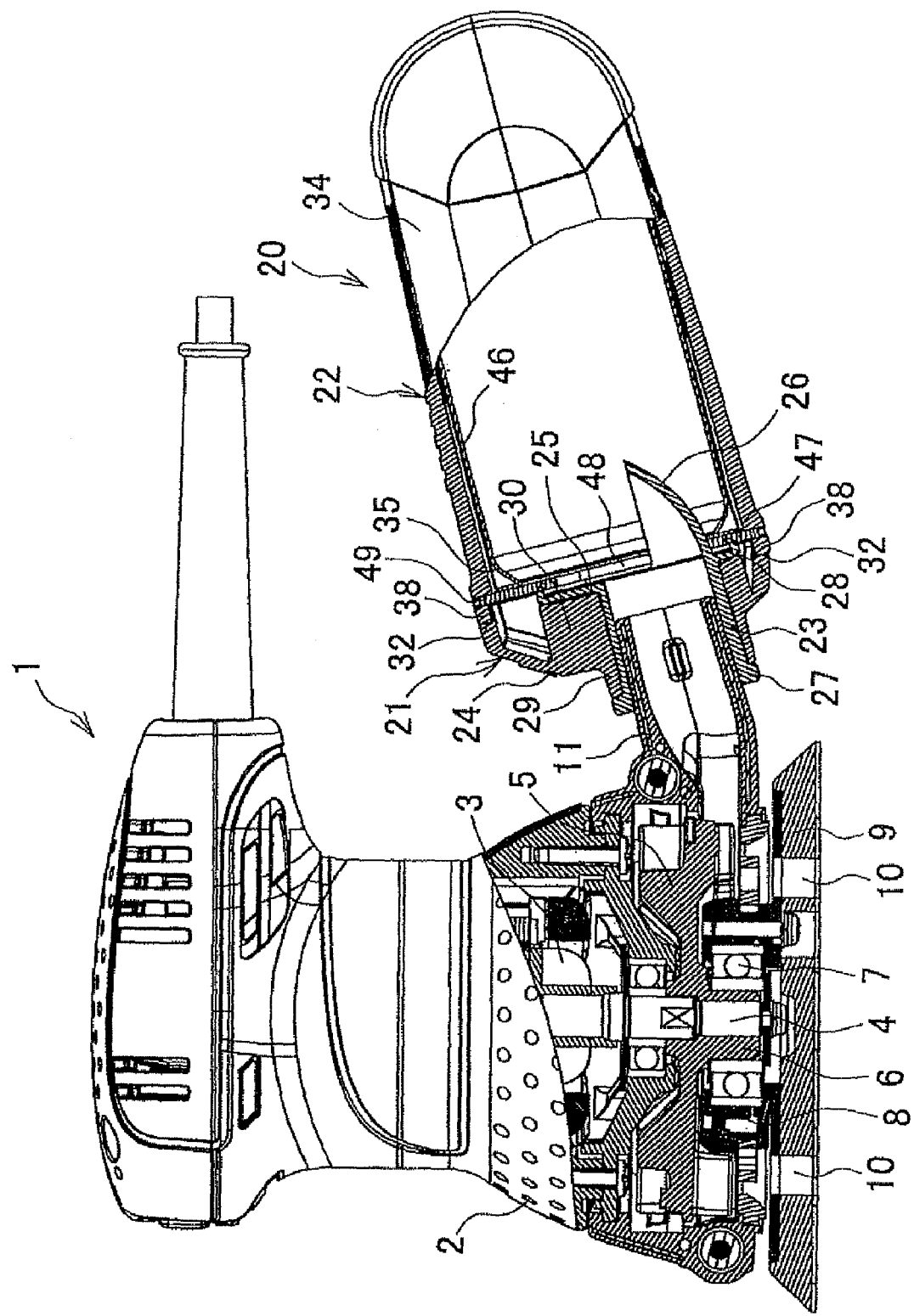
FIG. 1 is a vertical sectional view of a sander and a dust box.

One exemplary embodiment of a dust box attached to a random orbital sander as an electric tool is shown in FIG. 1.

As best seen in FIG. 1, a random orbital sander (hereinafter simply referred to as a "sander") 1 has a housing 2 and a motor 3 which is accommodated in the housing 2 with its output shaft 4 facing down. A fan 5 is attached to a lower end of the output shaft 4. An eccentric shaft 6 is formed integrally with the output shaft 4 at a lower end of the fan 5 and is offset from the axial center of the output shaft 4. A bearing box 8 supporting a ball bearing 7 is attached to the eccentric shaft 6 in such a manner as to be offset from the eccentric shaft 6, and a pad 9 is mounted on a lower end of the bearing box 8.

When the motor 3 is driven and the output shaft 4 rotates, a rotation of the output shaft 4 is transmitted via the ball bearing 7 that is offset from the output shaft 4 and to the bearing box 8 that is further offset from the ball bearing 7, so that the pad 9 begins to move in a random orbit (i.e., orbital movement plus rotation). Therefore, a sanding paper attached to the bottom of the pad 9 sands or grinds a workpiece. Dust particles generated at the sanding process are drawn into the housing 2 through a plurality of dust collection holes 10 formed in the pad 9 by an airflow caused by the rotation of the fan 5, and they are discharged from the housing 2 through a nozzle 11 extending sidewardly from the housing 2.

Figure 2:
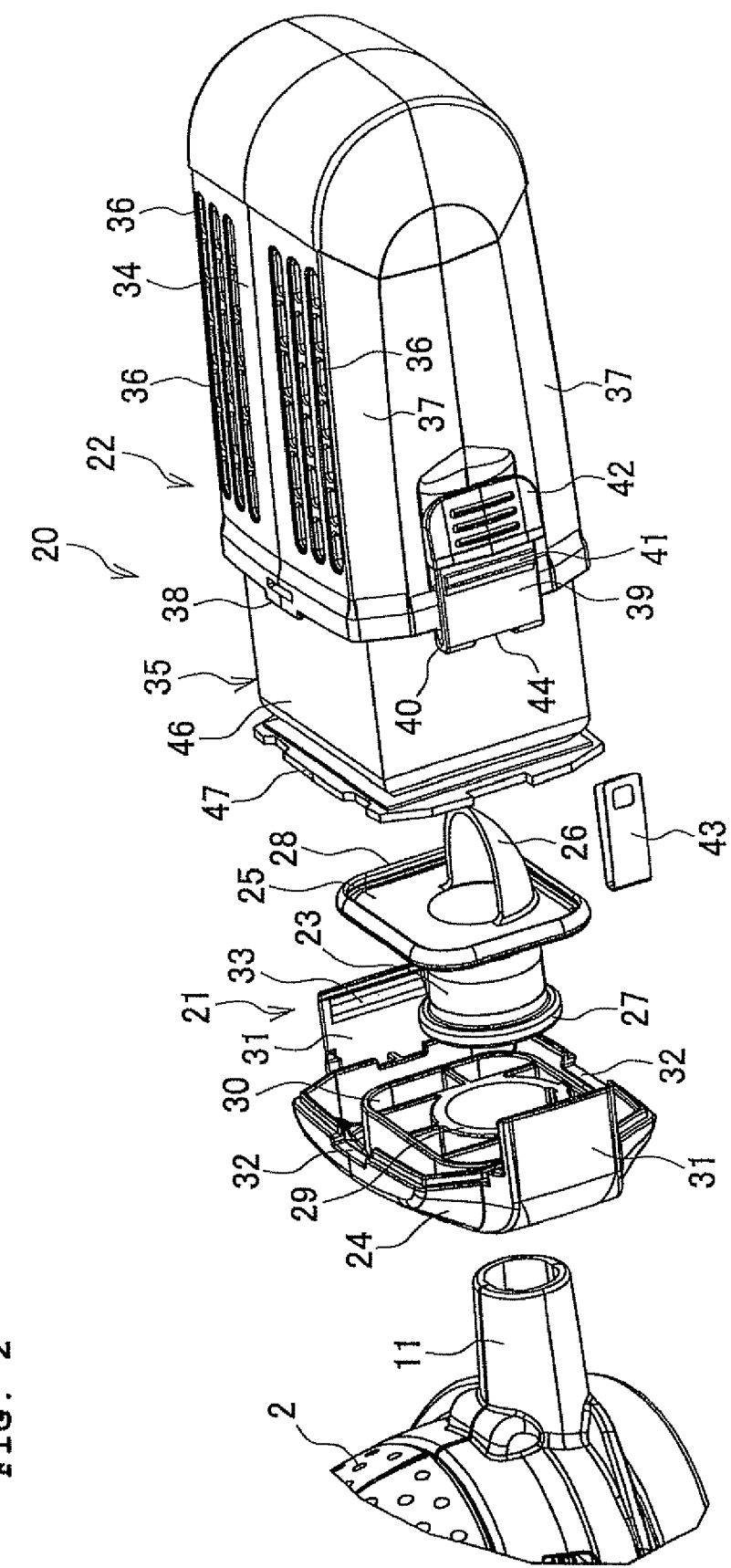
FIG. 2 is an exploded perspective view of the dust box.

As best seen in FIGS. 1 and 2, a dust box 20 is attached to the nozzle 11. The dust box 20 mainly consists of an attachment portion 21 configured to be attached to the nozzle 11 of the sander 1, and a dust-collecting portion 22 connected to the attachment portion 21 and configured to store dust particles to be discharged from the nozzle 11 together with air.

The attachment portion 21 includes a sleeve 23 which is fitted onto the nozzle 11, and a cap 24 which is assembled with the sleeve 23 from a front side of the sleeve 23. It is noted that the terms "front side" and "rear side" respectively refer to the left-hand side and the right-hand side of FIGS. 1 and 2. The sleeve 23 is made of rubber, and a square-shaped flange 25 extends from the rear end of the sleeve 23. An air outlet portion 26 is formed on a rear surface of the flange 25 to receive a lower portion of an opening of the sleeve 23 and to guide air discharged from the opening of the sleeve 23 in an upward direction. Reference numeral 27 indicates a stopper flange provided at the front end of the sleeve 23 and extending peripherally around and outward of the sleeve 23. Reference numeral 28 indicates a rib which is formed peripherally around the rear surface of the flange 25.

Figure 3:
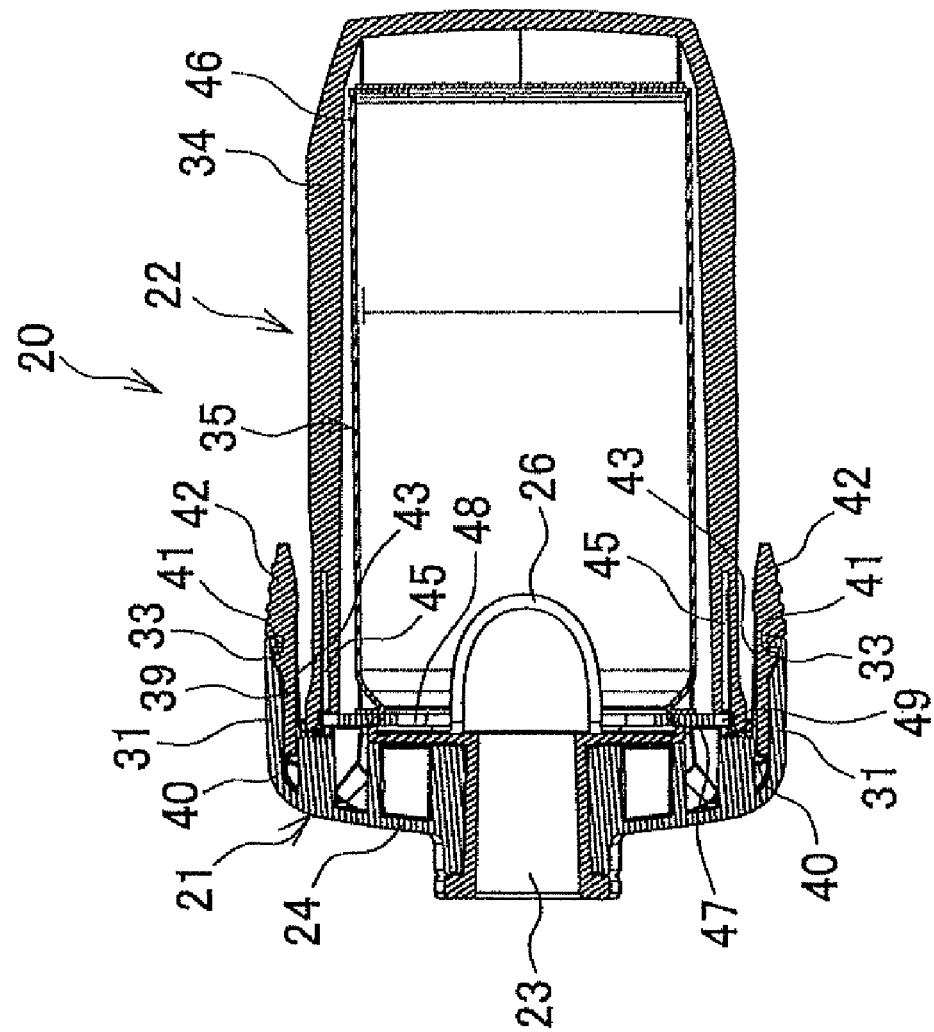
FIG. 3 is a transverse sectional view of the dust box.

The cap 24 is in the form of a square dish and is made of synthetic resin. The cap 24 has a tubular portion 29 at a center part of the cap 24, and the sleeve 23 penetrates the cap 24 through the tubular portion 29. A square-shaped receiving rib 30 is provided peripherally around the tubular portion 29. The receiving rib 30 protrudes backward from the cap 24, and when the sleeve 23 is inserted through the tubular portion 29 of the cap 24, the front surface of the flange 25 comes into contact with the receiving rib 30. A pair of hooks 31, 31 is provided at periphery of the cap 24, specifically at right and left sides of the cap 24. As also shown in FIG. 3, the pair of hooks 31, 31 protrudes backward from both sides of the cap 24. A pair of cuts 32, 32 is also formed in upper and lower peripheries of the cap 24. The hook 31 is shaped as a rectangular plate which is elastically deformable in right and left directions, and an engagement groove 33 is formed in an inner surface of the hook 31. The engagement groove 33 extends vertically at a rear end portion close to the rear edge of the hook 31.

As best seen in FIGS. 1 and 2, the dust-collecting portion 22 mainly consists of a box 34 having an opening at its front side and made of synthetic resin, and a paper bag 35 received in the box 34.

Figure 4C:
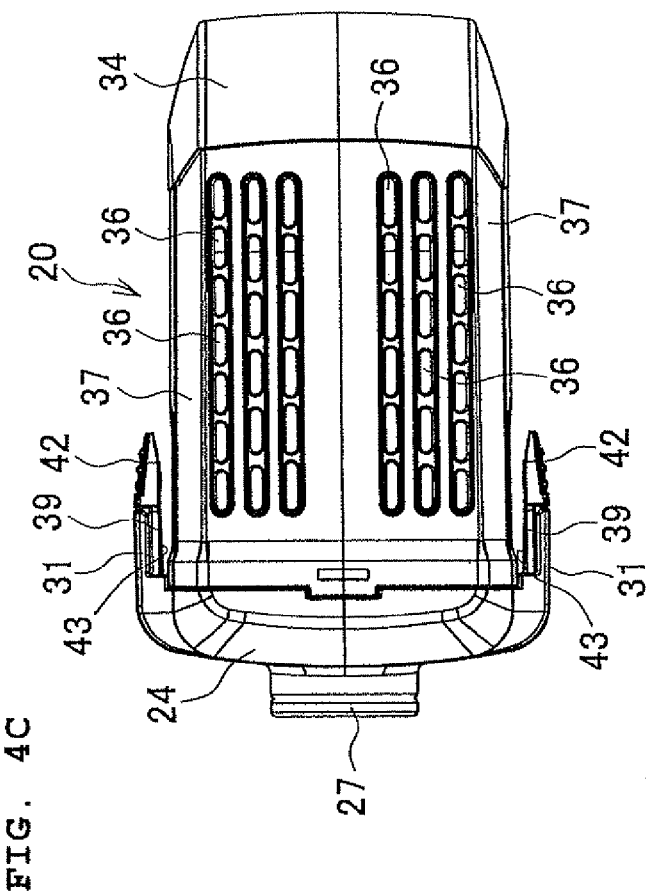

As best seen in FIG. 4C, the box 34 has a plurality of ventilation holes 36 in top and bottom surfaces of the box 34, and more specifically, the ventilation holes 36 are arranged entirely in upper and lower areas of the top and bottom surfaces of the box 34. The box 34 is formed as a hollow rectangular box with a bottom, and a rear end (bottom) of the box 34 has a U-shaped configuration. Further, as seen in FIGS. 4A and 413, four longitudinal edges extending from the front side to the rear side of the box 34 are chamfered to provide chamfered portions 37.

As best seen in FIG. 2, a pair of projections 38, 38 corresponding to the cuts 32 of the cap 24 are formed at upper and lower edges of the box 34 adjacent to the opening of the box 34, and a pair of elastic strips 39, 39 which constitute engagement portions for the pair of hooks 31, 31 are formed at right and left sides of the box 34, so that when the cap 24 is assembled with the box 34, the projections 38 of the box 34 are fitted into the corresponding cuts 32 of the cap 24 and the hooks 31 of the cap 24 are elastically hooked onto the corresponding elastic strips 39. The elastic strip 39 in the fowl of a rectangular plate extends from the opening of the box 34 and is folded back outward so as to extend backward along a side surface of the box 34 without contacting thereto. The pair of hooks 31, 31 elastically hook onto the corresponding elastic strips 39, 39 when the cap 24 is assembled with the box 34. For this reason, a projection 41 is formed on an outer surface of the elastic strip 39, which runs vertically and is fitted into the corresponding engagement groove 33 of the hook 31. When the cap 24 is assembled with the box 34, a front-side portion of each elastic strip 39 is covered with the hook 31 whereas a rear-side portion thereof is exposed to provide an operating portion 42.

Reference numeral 43 indicates a strip-shaped leaf spring which constitutes a spring member. As best seen in FIG. 2, the leaf spring 43 is folded back to provide right and left halves, and is inserted through a cut 44 formed at a fold-back portion 40 of the elastic strip 39 such that one half of the leaf spring 43 is inserted into a slit 45 (see FIG. 3) which is formed in the inner surface of the side wall of the box 34 while the other half of the leaf spring 43 is fitted onto the outer surface of the side wall of the box 34 to support the reverse surface of the elastic strip 39. Accordingly, in addition to the resilient action of the elastic strip 39 per se, the leaf spring 43 assists the elastic strip 39 to be elastically held in a position parallel to the side surface of the box 34.

The paper bag 35 consists of a bag body 46 in the form of a square bottom paper bag having an opening, and a square-shaped cardboard portion 47 adhered to the bag body 46 and having a central opening 48 in communication with the opening of the bag body 46. The paper bag 35 can be set in the box 34 when the bag body 46 is held in the box 34 and the cardboard portion 47 is fitted into an attachment groove 49 that is formed in an inner surface of the box 34 adjacent to the front end of the opening of the box 34.

According to the dust box 20 as constructed above, when the sleeve 23 is inserted into and penetrates through the tubular portion 29 of the cap 24, the front end of the tubular portion 29 of the cap 24 comes into contact with the stopper flange 27 of the sleeve 23, and the flange 25 of the sleeve 23 comes into contact with the receiving rib 30 of the cap 24, so that the sleeve 23 and the cap 24 are assembled together. After the paper bag 35 is set in the box 34, the cap 24 is assembled with the box 34 from the opening of the box 34 such that the cuts 32 of the cap 24 and the projections 38 of the box 34 are facing to each other.

Figure 4B:
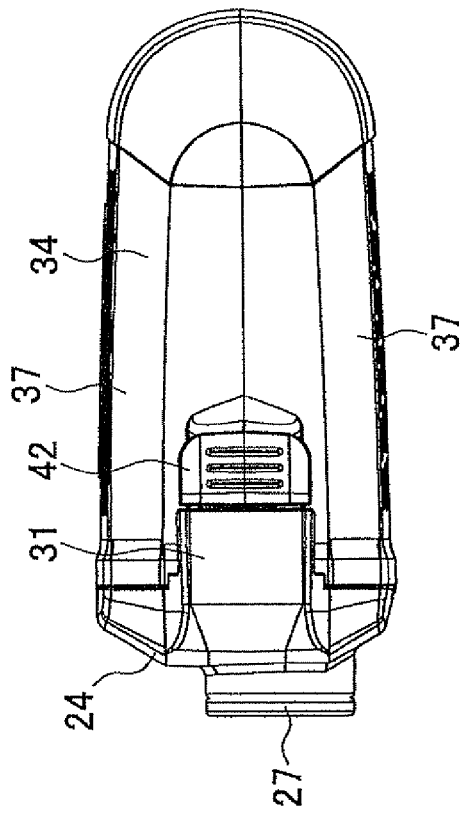
Figure 4A:
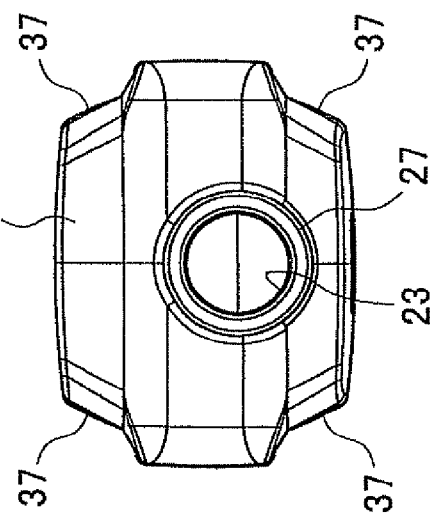

As seen in FIGS. 3 and 4B, the pair of hooks 31 of the cap 24 then elastically hook onto and cover front-side portions of the corresponding elastic strips 39, 39 of the box 34 from outsides of the elastic strips 39, 39, so that the engagement grooves 33 are elastically fitted onto the corresponding projections 41 to effect locking engagement therebetween. In the mean time, the projections 38 of the box 34 are fitted into the corresponding cuts 32 of the cap 24. Accordingly, the cap 24 and the box 34 are assembled together, and the connection of the attachment portion 21 and the dust-collecting portion 22 are completed. In this assembled position, the rib 28 which is formed peripherally around the rear surface of the flange 25 of the sleeve 23 abuts on the front surface of the cardboard portion 47 of the paper bag 35 and seals a space between the flange 25 and the cardboard portion 47, and the air outlet portion 26 extends through the central opening 48 of the cardboard portion 47 and is positioned in the bag body 46.

The assembled dust box 20 is attached to the sander 1 by inserting the sleeve 23 of the dust box 20 onto the nozzle 11 of the sander 1.

When dust particles and air are discharged from the nozzle 11 during the sanding process using the sander 1, the air flows through the sleeve 23 and out from the air outlet portion 26 into the bag body 46 and is discharged externally from the bag body 46 through the ventilation holes 36. Dust particles in the air stay and are stored in the paper bag 35. Because the entire paper bag 35 is protected by the box 34 in this dust-collecting state of the paper bag 35, deformation or breakage of the paper bag 35 will not occur even if the user's hand or other object hits the dust box 20.

In order to empty dust particles stored in the paper bag 35, the user pulls out the sleeve 23 from the nozzle 11 to remove the dust box 20 from the sander 1. The user grips the operating portions 42, 42 of the pair of elastic strips 39, 39 by fingers with the cap 24 facing up, and then depresses the operating portions 42, 42 inward. Accordingly, the elastic strips 39, 39 deflect inward and they are remote from the hooks 31, 31, by which position the attachment portion 21 can be separated from the dust-collecting portion 22 to disengage the elastic engagement between the engagement grooves 33, 33 and the projections 41, 41.

After separation of the attachment portion 21 from the dust-collecting portion 22, the user holds the box 34 of the dust-collecting portion 22 and turns the opening of the box 34 upside down so that the opening faces down to a dust collector chute, etc. Therefore, dust particles stored in the paper bag 35 are discharged from the central opening 48 without removing the paper bag 35 from the box 34. After emptying the paper bag 35, the box 34 is assembled with the cap 24 and the assembled dust box 20 is attached to the sander 1. As described above, the dust particles stored in the paper bag 35 can be disposed while the box 34 is always held by the user. Therefore, deformation or breakage of the paper bag 35 will not occur.

With the constructions of the dust box 20 and the sander 1 according to the above exemplary embodiment, the dust-collecting portion 22 consists of the box 34 which is made of synthetic resin and configured to be detachably connected to the attachment portion 21, and the paper bag 35 received in the box 34 and configured to store dust particles. Therefore, the paper bag 35 is always protected by the box 34, and deformation or breakage of the paper bag 35 will not occur even if the paper bag 35 is made of a fragile material, which is convenient for the usage of the paper bag 35.

According to the above exemplary embodiment, the attachment portion 21 and the dust-collecting portion 22 are connected by means of the hooks 31 formed on the attachment portion 21 and the corresponding engagement portions (elastic strips 39) formed on the box 34, and the hooks 31 are elastically coupled to the corresponding elastic strips 39 when the attachment portion 21 and the dust-collecting portion 22 are assembled together. Therefore, the engagement and disengagement of the attachment portion 21 and the dust-collecting portion 22 are readily performed, which can improve usability of the dust box 20.

According to the above exemplary embodiment, a pair of hooks 31 protrude backward from the attachment portion 21, and the engagement portions corresponding to the hooks 31 extend from the opening of the box 34 and are folded back outward so as to extend backward along the side surfaces of the box 34 without contacting thereto. Further, each of the engagement portions provides the elastic strip 39 having the projection 41 onto which the engagement groove 33 of the corresponding hook 31 is elastically fitted at the front-side portion of the elastic strip 39 while the rear-side portion of the elastic strip 39 is exposed to provide the operating portion 42 when the attachment portion 21 and the dust-collecting portion 22 are assembled together, and an elastic engagement between the hook 31 and the elastic strip 39 is disengaged by depressing the operating portion 42 of the elastic strip 39 toward the side surface of the box 34. Because the projection 41 of the elastic strip 39 and the operating portion 42 are adjacent to each other, depression of the operating portion 42 causes the projection 41 to deform inward, thereby disengaging the elastic engagement of the dust-collecting portion 22 relative to the attachment portion 21.

According to the above exemplary embodiment, a pair of leaf springs 43, 43 are attached to right and left sides of the box 34 to ensure that the elastic strips 39 are elastically supported by the leaf springs 43 without contacting to the side surfaces of the box 34. Use of the leaf springs 43, 43 ensures that the elastic strips 39, 39 are elastically supported without contacting to the side surfaces of the box 34. This can further improve reliability of elastic engagement and disengagement of the elastic strips 39, 39 relative to the hooks 31, 31.

Further, according to the above exemplary embodiment, the box 34 is formed as a hollow rectangular box, and four longitudinal edges thereof are chamfered to provide the chamfered portions 37. This can reduce the size of the box 34, which improves handling ability of the box 34.

Although the present invention has been described in detail with reference to the above exemplary embodiment, the present invention is not limited to the above specific embodiment and various changes and modifications may be made without departing from the scope of the appended claims.

For example, in the above exemplary embodiment, the engagement grooves 33 are formed in the hooks 31 and the corresponding projections 41 are formed on the elastic strips 39. However, the engagement grooves 33 and the projections 41 are formed conversely such that the engagement grooves are formed in the elastic strips 39 and the corresponding projections are formed on the hooks 31. Further, the pair of hooks 31, 31 are provided on the attachment portion 21. However, these hooks may be provided on the box 34 adjacent to and extending forward from the opening of the box 34, while the corresponding engagement portions are provided at both side surfaces of the attachment portion 21.

Further, as long as the box 34 can protect the paper bag 35, various design variations may be applied to the box 34 where necessary. For example, the chamfered portions 37 may be omitted, ventilation holes 36 may be provided also in the bottom surface and/or side surfaces of the box 34, or the box 34 may be formed as an open box in which the front and rear portions positioned along the longitudinal direction of the box are opened. Of course two or more of the above design variations may be combined together. A frame-like box may be employed unless disabling the handling ability of the box 34. The spring members may also be omitted if the elastic strips can provide sufficient elasticity.

In the meantime, the attachment portion 21 may be modified where necessary. For example, instead of providing the sleeve 23 and the cap 24 as separate parts, they can be formed as an integrated member. The air outlet portion 26 may be formed as a tubular member, or alternatively the air outlet portion 26 may be omitted.

The dust box 20 according to the present invention may be adapted to other electric tools with a dust-discharging nozzle other than the random orbital sander 1 disclosed in the above embodiment. For example, the dust box 20 is applicable to a belt sander or a circular saw.

What is claimed is:

1. A dust box comprising:
   an attachment portion configured to be attached to a dust-discharging nozzle extending from a housing of an electric tool; and
   a dust-collecting portion connected to the attachment portion and configured to store dust particles to be discharged from the nozzle,
   wherein the dust-collecting portion comprises a box which is made of synthetic resin and configured to be detachably connected to the attachment portion, and a bag received in the box and configured to store the dust particles to be discharged from the nozzle,
   the attachment portion and the dust-collecting portion are connected by means of at least one hook and corresponding engagement portion, the hook being formed on the attachment portion when the engagement portion is formed on the box, and being formed on the box when the engagement portion is formed on the attachment portion and configured such that the hook is elastically coupled to the engagement portion when the attachment portion and the dust-collecting portion are assembled together,
   the hook protrudes backward from the attachment portion, and the engagement portion extends from an opening of the box and is folded back outward so as to extend backward along a side surface of the box without contacting thereto, and
   wherein the engagement portion provides an elastic strip onto which the hook is elastically hooked at a front-side portion of the elastic strip while a rear-side portion thereof is exposed when the attachment portion and the dust-collecting portion are assembled together, and an elastic engagement between the hook and the engagement portion is disengaged by depressing the rear-side portion of the elastic strip toward the side surface of the box.

2. A dust box according to claim 1, wherein the hooks and the corresponding engagement portions are provided at right and left sides of the attachment portion and the dust-collecting portion to be matched pairs.

3. A dust box according to claim 1, wherein an engagement groove is formed on an inner surface of the hook, and a projection is formed on an outer surface of the engagement portion so that when the hook is elastically engaged with the engagement portion, the projection is fitted into the engagement groove.

4. A dust box according to claim 1, wherein a spring member is attached to the box to ensure that the elastic strip is elastically supported by the spring member without contacting to the side surface of the box.

5. A dust box according to claim 1, wherein the box is formed as a hollow rectangular box, and four longitudinal edges thereof are chamfered.

6. A dust box according to claim 1, wherein top and bottom surfaces of the box have a plurality of ventilation holes, and wherein the box is formed as a hollow rectangular box with a bottom, and a rear end of the box has a U-shaped configuration.

7. A dust box according to claim 1, wherein the bag comprises a bag body in the form of a square bottom bag having an opening, and a square-shaped cardboard portion having a central opening and bonded to the opening of the bag body.

8. A dust box according to claim 7, wherein an attachment groove is formed on an inner surface of the box adjacent to a front end of an opening of the box so that the cardboard portion is fitted into the attachment groove.

9. A dust box according to claim 1, wherein the attachment portion comprises a sleeve which is fitted onto the nozzle, and a cap having a tubular portion through which the sleeve penetrates the cap, and wherein the hooks protrude backward at right and left side edges of the cap.

10. A dust box according to claim 9, wherein a flange is formed at a rear end of the sleeve, and an air outlet portion is formed on a rear surface of the flange to receive a lower portion of an opening of the sleeve and to guide air discharged from the opening of the sleeve in an upward direction.

11. A dust box according to claim 10, wherein a rib is formed peripherally around the rear surface of the flange, the rib being configured to abut on a front portion of the bag and to seal a space between the flange and the bag.

12. A dust box according to claim 9, wherein a pair of cuts are formed at upper and lower edges of the cap, and the box has a pair of projections to be fitted into the corresponding cuts at upper and lower edges adjacent to an opening of the box.

13. An electric tool comprising:
   a housing;
   a nozzle extending from the housing and configured to discharge dust particles from the housing; and
   a dust box of claim 1 attached to the nozzle.

\* \* \* \* \*